US011885827B2

(12) United States Patent
Luo et al.

(10) Patent No.: US 11,885,827 B2
(45) Date of Patent: Jan. 30, 2024

(54) HIGH ANTI-VIBRATION GAS DENSITY MONITOR

(71) Applicant: SHANGHAI ROYE ELECTRIC CO., LTD., Shanghai (CN)

(72) Inventors: Libo Luo, Shanghai (CN); Xuejun Zhang, Shanghai (CN); Min Chang, Shanghai (CN); Bing He, Shanghai (CN); Xiaoli Shen, Shanghai (CN); Haiyong Jin, Shanghai (CN)

(73) Assignee: SHANGHAI ROYE ELECTRIC CO., LTD., Shanghai (CN)

(*) Notice: Subject to any disclaimer, the term of this patent is extended or adjusted under 35 U.S.C. 154(b) by 81 days.

(21) Appl. No.: 17/616,034

(22) PCT Filed: Mar. 2, 2021

(86) PCT No.: PCT/CN2021/078624
§ 371 (c)(1),
(2) Date: Dec. 2, 2021

(87) PCT Pub. No.: WO2021/179951
PCT Pub. Date: Sep. 16, 2021

(65) Prior Publication Data
US 2022/0317008 A1 Oct. 6, 2022

(30) Foreign Application Priority Data
Mar. 11, 2020 (CN) .................. 202010164130.4

(51) Int. Cl.
*G01N 9/26* (2006.01)
*H01H 35/26* (2006.01)
(52) U.S. Cl.
CPC ......... *G01N 9/266* (2013.01); *H01H 35/2657* (2013.01); *H01H 35/2671* (2013.01)

(58) Field of Classification Search
CPC ...... G01N 9/266; G01N 9/36; H01H 35/2657; H01H 35/2671; H01H 33/563; H01H 35/32; H01H 35/26
USPC .................. 73/30.02, 23.2, 24.05, 1.01, 1.06
See application file for complete search history.

(56) References Cited

FOREIGN PATENT DOCUMENTS

| CN | 2809852 Y | 8/2006 |
|---|---|---|
| CN | 1971795 A | 5/2007 |
| CN | 201465901 U | 5/2010 |
| CN | 201478199 U | 5/2010 |
| CN | 101847544 A | 9/2010 |
| CN | 102013357 A | 4/2011 |
| CN | 201804791 U | 4/2011 |

(Continued)

*Primary Examiner* — Robert R Raevis
(74) *Attorney, Agent, or Firm* — COATS & BENNETT, PLLC

(57) ABSTRACT

A high anti-vibration gas density monitor is provided, including a monitor enclosure, a signal control mechanism, and an indication value display mechanism independent from the signal control mechanism which are provided in the monitor enclosure. The signal control mechanism includes at least one corrugated pipe, a sealed compensation chamber, a signal generator, and a signal regulation mechanism. The corrugated pipe is perpendicular to a side wall of a control casing. The monitor enclosure includes an independent sealed compartment used to mount the indication value display mechanism. The sealed compartment is filled with anti-vibration oil, or is hermetically filled with gas. The indication value display mechanism includes a Bourdon tube, a base, an end holder, a movement, a pointer, and a dial.

26 Claims, 6 Drawing Sheets

(56) References Cited

FOREIGN PATENT DOCUMENTS

| | | |
|---|---|---|
| CN | 102543571 A | 7/2012 |
| CN | 202549717 U | 11/2012 |
| CN | 107808798 A | 3/2018 |
| CN | 111192791 A | 5/2020 |
| IN | 201004434 Y | 1/2008 |
| KR | 20080076489 A | 8/2008 |

HIGH ANTI-VIBRATION GAS DENSITY MONITOR

CROSS REFERENCE TO RELATED APPLICATIONS

This application is a national stage application of International Patent Application No. PCT/CN2021/078624, filed on Mar. 2, 2021, which claims priority to Chinese Patent Application No. 202010164130.4, filed on Mar. 11, 2020.

TECHNICAL FIELD

The present disclosure relates to the technical field of electrical devices, and more specifically, to a high anti-vibration gas density monitor.

BACKGROUND ART

Currently, an oil-free gas density monitor using a micro switch as a contact is commonly used to monitor a gas density in an electrical device. Although having good electrical performance, the micro switch used in the gas density monitor is low in accuracy because of a contact operation arm and a limited displacement thereof.

Some gas density monitors are also disclosed in Chinese patents or applications Nos. CN200510110648.5, CN200720066586.7, CN200910195174.7, CN200920209217.8, CN201010171798.8, CN201020190271.5, CN201210032293.2, CN201220047225.9, and CN200920075456.9. The gas density monitors disclosed in patent Nos. CN200510110648.5 and CN200910195174.7 each include a display mechanism and a control mechanism, and a temperature of the display mechanism and a temperature of the control mechanism are each compensated by using a temperature compensation sheet. In this way, a highly accurate operation and display cannot be realized. What's worse, being long and a cantilever, the contact operation arm fiercely vibrates when the switch is operated, causing the gas density monitor to malfunction, and even damaging the micro switch to make the gas density monitor completely useless. In short, the oil-free gas density monitor has bad anti-vibration performance and low accuracy, failing to ensure a system that works reliably.

The gas density monitors disclosed in patent Nos. CN201020190271.5 and CN201010171798.8 each include a displacement magnification mechanism. A start end of the displacement magnification mechanism is connected to the other end of a temperature compensation element. A magnification end of the displacement magnification mechanism drives a contact operation handle of a micro switch, so as to turn the contact on the micro switch to be on or off. When a gas density changes, a Bourdon tube and the temperature compensation element each generates a displacement. The displacements are magnified by the displacement magnification mechanism and then transmitted to the micro switch, so that the micro switch sends a corresponding signal and the density monitor completes its work. However, when the switch is turned on or turned up, the Bourdon tube and the temperature compensation element will vibrate and generate displacements due to the vibration. The displacements are also magnified by the displacement magnification mechanism and then transmitted to the micro switch, so that the micro switch sends a corresponding signal. As a result, a malfunction happens. That is, the gas density monitor has bad anti-vibration performance and cannot ensure a system to work reliably, bringing a great risk to safe operation of the main power grid. In addition, these gas density monitors cannot meet a requirement of reclosing of a switch. That is, when a gas-filling pressure (a density) is lower than an alarm pressure, a shock test of 50 g and 11 ms cannot be withstood, and a lockout contact malfunctions. For example, for a 0.6/0.52/0.5 density monitor, if a shock test of 50 g and 11 ms is performed when a gas pressure (a density) decreases to an alarm operation contact, the lockout contact malfunctions; (i.e., the switch is locked out). In this way, a requirement of reclosing of the switch cannot be met. A deficiency of patent No. CN200520115321.2 is similar to that of patent No. CN201010171798.8. That is, a displacement caused by vibration is magnified by a displacement magnification mechanism and then transmitted to a micro switch (Namely, the displacement is transmitted to a movement control shaft by using a fan-shaped control gear and then transmitted to the micro switch by using the movement control shaft). As a result, the displacement caused by the vibration is greatly magnified, making the vibration more acute. Due to the acute vibration generated when the switch is closed or opened, a gas density monitor with better anti-vibration performance is urgently needed, and the above gas density monitors cannot meet the requirement.

Temperatures of the above gas density monitors are compensated by using temperature compensation sheets, so that it's hard to achieve high accuracy. Besides, the enclosures are not completely sealed, and the gas density monitors are relative-pressure density monitors that are affected by an altitude.

Patent No. CN 200920075456.9 discloses an oil-filling anti-vibration gas density monitor. A micro switch is also used as a contact in the density monitor. For such density monitors mounted on the scene, liquid (anti-vibration oil) leakage always occurs in an enclosure of the gas density monitor after some time. During actual operation, oil leakage is very common in sight glasses (instrument glasses) of the gas density monitor disclosed in patent No. CN200920075456.9 and an oil-filling density monitor with an electrical contact widely used at the present, badly affecting system safety and reliability. What's more, to change these density monitors will cost a lot of money. After long-time observation and analysis, the reason why oil or gas leakage often occurs is found. It's because sealing is performed on small arc surfaces of the sight glasses (the instrument glasses) of the density monitors, making the sealing effect not so good and because sealing rings of the density monitors will age. In a high altitude area, because a differential pressure in an instrument glass is great, the instrument glass even explodes, causing safety issues. For an absolute-pressure oil-filling density monitor, as temperature increases, a differential pressure outside and inside an enclosure is great, such that an instrument glass also explodes, causing safety issues. In a word, an operation contact used in a current density monitor is mainly an electrical contact or a micro switch. A density monitor with an electrical contact is usually filled with anti-vibration silicone oil, and a density monitor with a micro switch also needs to be filled with anti-vibration silicone oil in some special occasions. For the density monitors filled with anti-vibration oil, because a control mechanism and a display mechanism are in a same enclosure, and the display mechanism needs to be observable, sight glasses (instrument glasses) are required. When anti-vibration oil is filled, the sight glasses (the instrument glasses) are immersed in the anti-vibration oil. Because sealing is performed on arc surfaces (or small arc surfaces) of the sight glasses (the instrument glasses) and enclosure, making the sealing effect bad, and because sealing rings will age, oil leakage often occurs. This brings a loss and even safety issues to a user, so that creation is urgently needed. Therefore, it's urgent to provide a gas density monitor with good anti-vibration performance at a contact and a display mechanism, good electrical performance, high accuracy, a long service life and thin profile, and can be used in various occasions. Specifically, it's required that an oil-filling density monitor can work for a long time without leaking oil, to ensure safety and reliability of power grid, or it's required that an enclosure of the density monitor is completely sealed in a long working period and that the density monitor is an absolute-pressure density monitor that is not be affected by an altitude.

SUMMARY

To overcome the deficiencies of the prior art, the present disclosure provides a high anti-vibration gas density monitor. The high anti-vibration gas density monitor has good anti-vibration and electrical performance, high accuracy, and a long service life. It is thin in profile and can be both oil-filled and gas-filled.

The foregoing technical objectives of the present disclosure are achieved by using the following technical solutions.

A high anti-vibration gas density monitor is provided, including a monitor enclosure, a signal control mechanism, and an indication value display mechanism. A sealed compartment is provided in the monitor enclosure, the indication value display mechanism is provided in the sealed compartment, and the sealed compartment is filled with anti-vibration oil or hermetically filled with gas; the signal control mechanism is provided in the monitor enclosure and outside the sealed compartment; and the signal control mechanism and the indication value display mechanism are in gas communication with each other;

the signal control mechanism comprises a corrugated pipe, a second sealed cavity, a signal generator, and a signal regulation mechanism, and the corrugated pipe is provided in the second sealed cavity; one end of the corrugated pipe is sealed, and the other end of the corrugated pipe is in communication with an electrical device, and compensation gas is provided in the second sealed cavity; or the one end and the other end of the corrugated pipe are sealed to form a first sealed cavity, the compensation gas is provided in the first sealed cavity of the corrugated pipe, and the second sealed cavity is in communication with the electrical device; the signal control mechanism monitors a gas density by using the corrugated pipe and the second sealed cavity and the first sealed cavity, and when the gas density in the electrical device changes, the corrugated pipe is compressed or expanded to produce an axial displacement so as to drive the signal regulation mechanism to trigger the signal generator to generate a signal; and the indication value display mechanism comprises a Bourdon tube, a base, an end holder, a temperature compensation element, a movement, a pointer, and a dial; one end of the Bourdon tube is fixed to the base, both the other end of the Bourdon tube and one end of the temperature compensation element are fixed to the end holder, the other end of the temperature compensation element is directly connected to the movement or connected to the movement via a connection arm and a connecting rod, the pointer is mounted on the movement, and the dial is mounted in the sealed compartment.

In some embodiments, the sealed compartment may include an instrument glass, a display chassis, and a first sealing ring. The instrument glass may be of a cylindrical structure with an open end, the display chassis may be mounted at the open end of the instrument glass, the first sealing ring may be provided between the instrument glass and the display chassis for sealing, and an inner cavity of the instrument glass may be sealed by the display chassis to form the sealed compartment for accommodating the indication value display mechanism.

In some embodiments, the instrument glass may be fixed to the display chassis via a fastener.

In some embodiments, the display chassis is further provided with a base mounting hole, a bottom end of the base is mounted on the display chassis through the base mounting hole, a second sealing ring may be provided between the base mounting hole and the base, an end of the base extending out of the base mounting hole may be firmly fixed to the display chassis via a nut and in gas communication with the indication value display mechanism, and a venting hole in communication with the Bourdon tube may be provided in the base.

In some embodiments, the display chassis may be further provided with an oil-filling and gastight inlet in communication with an inner cavity of the sealed compartment, a gastight screw may be provided on the oil-filling and gastight inlet, and a gastight sealing ring may be provided between the gastight screw and the oil-filling and gastight inlet.

In some embodiments, a head end of the monitor enclosure is further provided with a transparent front-layer glass, a third sealing ring may be provided between the front-layer glass and a front wall of the instrument glass, and the front-layer glass may be fixed to the monitor enclosure via an instrument panel.

In some embodiments, a fixing flange may be provided around the front wall of the instrument glass, the instrument panel may be connected to the instrument glass via the fixing flange, and a fourth sealing ring is provided between a side wall of the instrument glass and the instrument panel.

In some embodiments, the instrument panel sleeves on the front-layer glass and the instrument glass, a side wall of the instrument panel may be higher than a side wall of the instrument glass, and a sealing gasket may be provided between a top open end of the monitor enclosure and the display chassis.

In some embodiments, a supporting element may be provided between the display chassis and a bottom of the monitor enclosure.

In some embodiments, the signal control mechanism may further include a control casing, a first sealing element, a second sealing element, a third sealing element, and an outlet connection socket. One end of the corrugated pipe may be welded to the first sealing element, and the other end of the corrugated pipe may be welded to the second sealing element. A space inside the corrugated pipe may be the first sealed cavity, and the first sealed cavity may be filled with the compensation gas, to form a sealed compensation chamber. The outlet connection socket may be fixed to the third sealing element or the control casing, and the control casing may be hermetically connected to the first sealing element and the third sealing element. A space inside the control casing and outside the corrugated pipe may be the second sealed cavity, the second sealed cavity may be in communication with the electrical device and in gas communication with the indication value display mechanism; and the signal regulation mechanism and the signal generator may be provided in the second sealed cavity; or the first sealed cavity may be in communication with the electrical device and in gas communication with the indication value display mechanism, and the second sealed cavity may be filled with the compensation gas, to form a sealed compensation chamber.

In some embodiments, the signal control mechanism may further include a control casing, a first sealing element, a second sealing element, a third sealing element, a sealing corrugated pipe, and an outlet connection socket. The outlet connection socket may be fixed to the control casing, the third sealing element may be provided in the control casing, the third sealing element may divide an inner cavity of the control casing into the second sealed cavity and a signal regulation cavity, the corrugated pipe may be provided in the second sealed cavity, the one end of the corrugated pipe may be welded to the first sealing element, and the other end of the corrugated pipe may be welded to the second sealing element. A space inside the corrugated pipe may be the first sealed cavity, and the first sealed cavity may be filled with the compensation gas, to form a sealed compensation chamber. One end of the sealing corrugated pipe may be welded to the second sealing element, the other end of the sealing corrugated pipe may be welded to the third sealing element, the control casing may be hermetically connected to the first sealing element and the third sealing element, the second sealed cavity may be in communication with the electrical device, and the second sealed cavity may be in gas communication with the indication value display mechanism; and the signal regulation mechanism and the signal generator may be provided in the signal regulation cavity; or the first sealed cavity may be in communication with the electrical device and may be in gas communication with the indication value display mechanism, and the second sealed cavity may be filled with the compensation gas, to form a sealed compensation chamber.

In some embodiments, the signal regulation mechanism may be connected to the corrugated pipe via a trigger lever, and the trigger lever may pull or push the signal regulation mechanism to trigger the signal generator to generate a signal.

In some embodiments, the trigger lever may be provided with a guiding element.

In some embodiments, the signal control mechanism may further include an air inlet in communication with the electrical device.

In some embodiments, the signal control mechanism may be fixed to a bottom of the monitor enclosure via a fixing element.

In some embodiments, the signal control mechanism may further include a limit mechanism, and the limit mechanism may be provided on the control casing and may be opposite to the signal regulation mechanism, to limit the signal regulation mechanism.

In some embodiments, the monitor may further include a connector, a first connection tube, and a second connection tube. The connector may be connected to the electrical device and may be fixed to the monitor enclosure, one end of the first connection tube may be connected to the electrical device via the connector, the other end of the first connection tube may be in communication with the base and may be connected to a venting hole in the base, one end of the second connection tube may be in communication with the base and connected to the venting hole in the base, and the other end of the second connection tube may be in communication with the signal control mechanism through the air inlet; or the one end of the first connection tube and the one end of the second connection tube each may be connected to the electrical device via the connector, the other end of the first connection tube may be connected to the base and may be in communication with the venting hole in the base, and the other end of the second connection tube may be in communication with the signal control mechanism through the air inlet; or the one end of the first connection tube may be connected to the electrical device via the connector, the other end of the first connection tube may be in communication with the signal control mechanism through the air inlet, the one end of the second connection tube may be in communication with the signal control mechanism through the air inlet, and the other end of the second connection tube may be in communication with the base and connected to the venting hole in the base.

In some embodiments, a base plate may be further provided at an outer bottom of the monitor enclosure, the connector may be fixed to the base plate, and the base plate may be connected to the monitor enclosure through multiple shock absorbers or shock pads.

In some embodiments, an insulation layer may wrap around the signal control mechanism or the monitor enclosure.

In some embodiments, the gas density monitor may further include an electrical signal remote transmission unit, and the electrical signal remote transmission unit may include a pressure sensor, a temperature sensor, a microprocessor, and a communication module. The microprocessor may be connected to the pressure sensor, the temperature sensor, and the communication module. Pressure and temperature signals may be collected by the microprocessor with the pressure sensor and the temperature sensor, and corresponding density values may be obtained by the microprocessor according to a gas pressure-temperature property, and the density values obtained by the microprocessor may be remotely transmitted by using the communication module, so that the gas density of the electrical device is monitored online.

In some embodiments, the temperature compensation element may be a bimetallic strip or a Bourdon tube hermetically filled with compensation gas or a micro corrugated pipe hermetically filled with compensation gas.

Compared with the prior art, the present embodiment has the following beneficial effects.

Compared with an oil-filling anti-vibration gas density monitor with a micro switch in the prior art and an oil-filling density monitor with an electrical contact widely used at the present, the high anti-vibration gas density monitor of the present embodiment designs a signal control mechanism and an indication value display mechanism independent from each other. The signal control mechanism includes at least one corrugated pipe, a sealed compensation chamber, at least one signal generator, and a signal regulation mechanism. A gas density is monitored by the corrugated pipe, the sealed compensation chamber, and the signal generator. Because the signal control mechanism uses the corrugated pipe and the sealed compensation chamber to monitor the gas density, and the corrugated pipe is small and has good anti-vibration performance, there is no need to fill oil. An independent sealed compartment used for mounting the indication value display mechanism is provided in the monitor enclosure. The sealed compartment is filled with anti-vibration oil or hermetically filled with gas. The indication value display mechanism can use anti-vibration oil to be high anti-vibration. Alternatively, the indication value display mechanism can use good sealing performance of the sealed compartment, to ensure that the density monitor is an absolute-pressure density monitor and cannot be affected by an altitude. Because the sealed compartment of the indication value display mechanism is well sealed, so that leakage of oil or gas is avoided, and the density delay can work for a long time. The indication value display mechanism is independent, so it is very easy to display a gas density in a whole range (from −0.1 MPa to 0.9 MPa) in the density monitor, especially a gas density starting from −0.1 MPa. When evacuation is performed, an evacuation degree can be displayed, so that application of the density monitor is easy to be promoted. In addition, the temperature compensation element is configured to compensate a temperature for the indication value display mechanism, further improving and ensuring accuracy. In a word, the monitor enclosure of the high anti-vibration gas density monitor of the present disclosure has good anti-vibration and electrical performance, high accuracy, and a long service life. It is thin in profile and can be both oil-filled and gas-filled without leakage.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and a person of ordinary skill in the art may still derive other accompanying drawings from these accompanying drawings without inventive labors.

Figure 1:
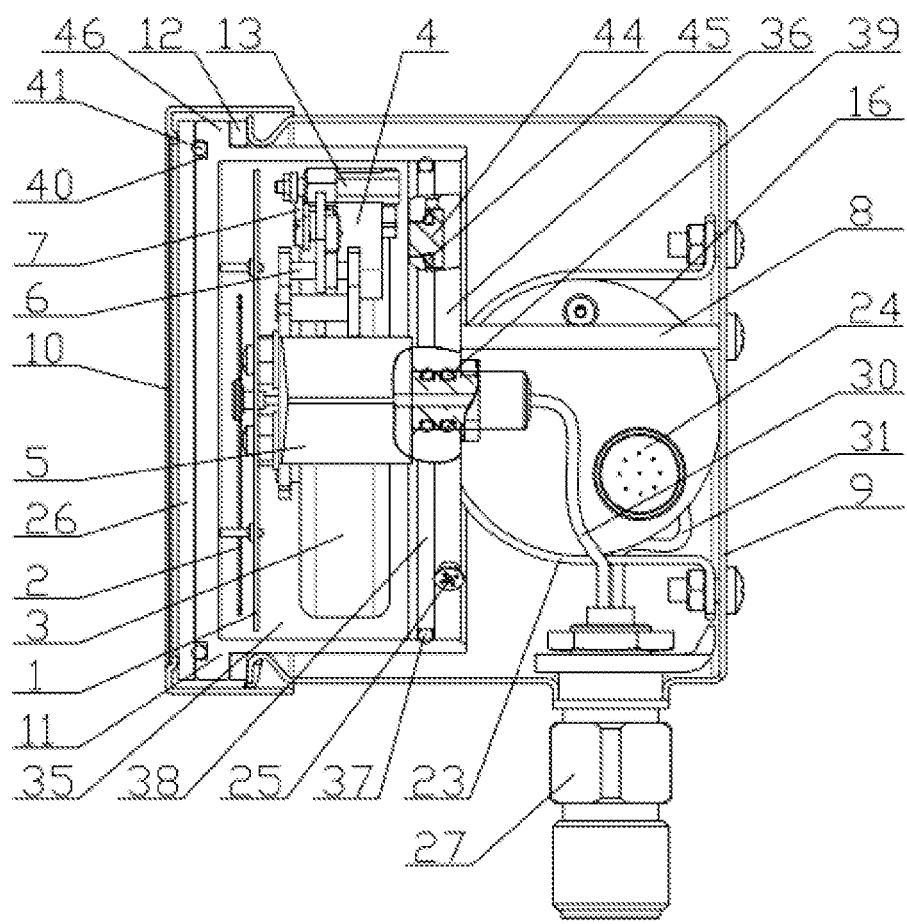
FIG. 1 is a schematic side structural diagram of a high anti-vibration gas density monitor in Embodiment 1 of the present disclosure.
Figure 2:
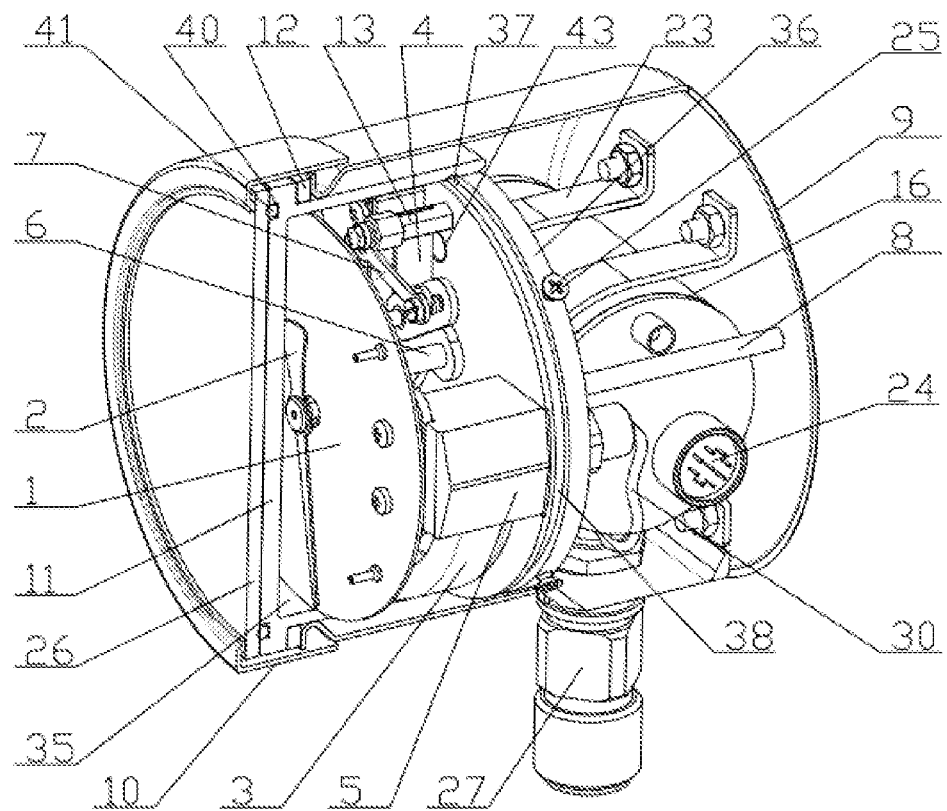
FIG. 2 is a schematic oblique side structural diagram of the high anti-vibration gas density monitor in Embodiment 1 of the present disclosure.
Figure 3:
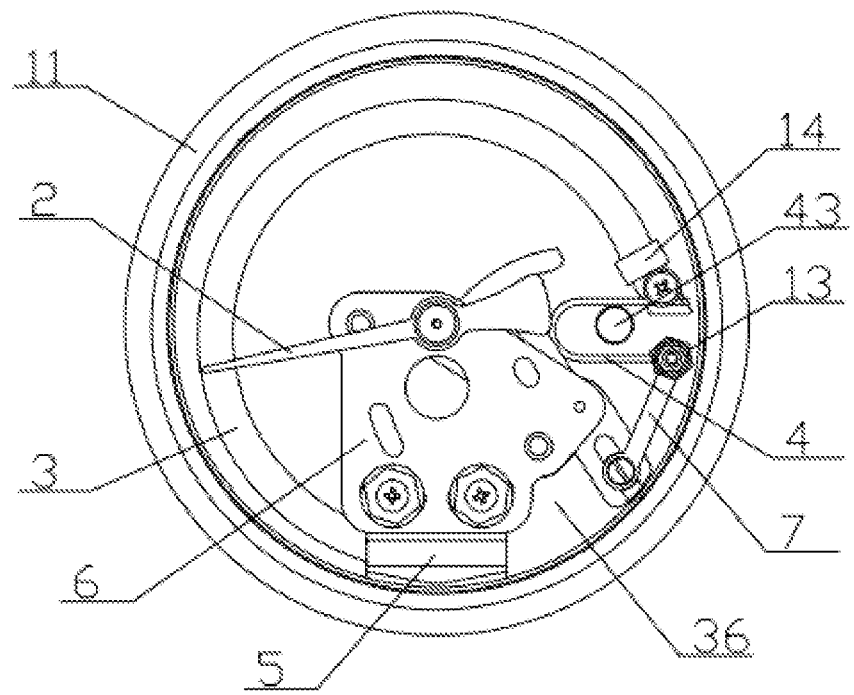
FIG. 3 is a schematic front structural diagram of an indication value display mechanism of the high anti-vibration gas density monitor in Embodiment 1 of the present disclosure.
Figure 4:
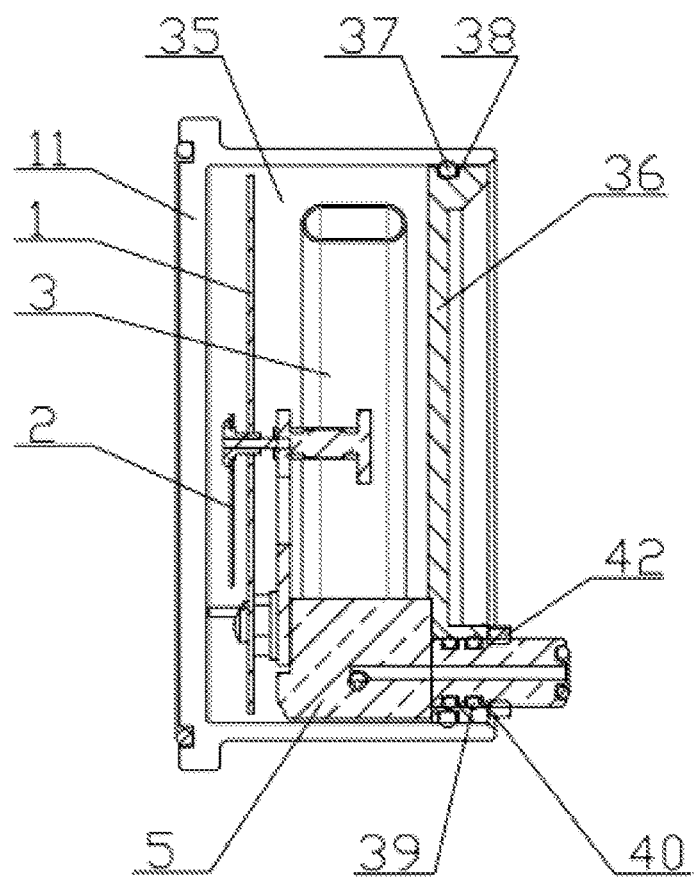
FIG. 4 is a schematic side structural diagram of the indication value display mechanism of the high anti-vibration gas density monitor in Embodiment 1 of the present disclosure.
Figure 5:
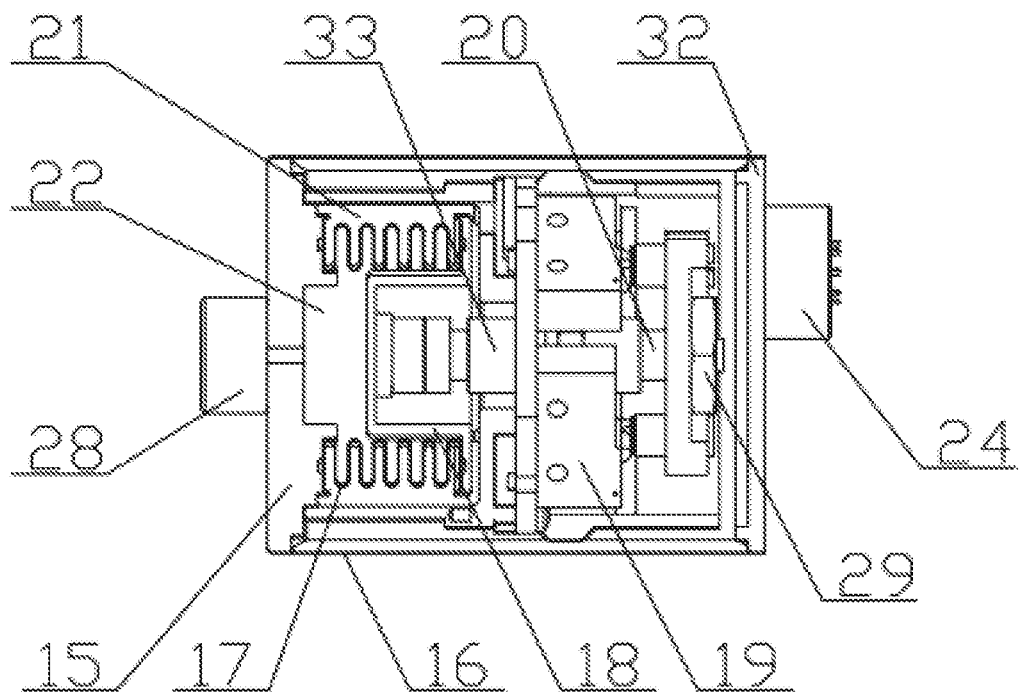
FIG. 5 is a schematic structural diagram of a signal control mechanism of the high anti-vibration gas density monitor in Embodiment 1 of the present disclosure.

Reference numerals: 1 dial, 2 pointer, 3 Bourdon tube, 4 temperature compensation element, 5 base, 6 movement, 7 connecting rod, 8 supporting element, 9 monitor enclosure, 10 instrument panel, 11 instrument glass, 12 sealing ring, 13 connection arm, 14 end holder, 15 first sealing element, 16 control casing, 17 corrugated pipe, 18 second sealing element, 19 signal generator, 20 signal regulation mechanism, 201 signal regulation element, 21 second sealed cavity, 22 first sealed cavity, 23 fixing element, 24 outlet connection socket, 25 fastener, 26 front-layer glass, 27 connector, 28 air inlet, 29 limit mechanism, 30 first connection tube, 31 second connection tube, 32 third sealing element, 33 guiding element, 34 sealing corrugated pipe, 35 sealed compartment, 36 display chassis, 37 first sealing ring, 38 first sealing groove, 39 second sealing ring, 40 third sealing groove, 41 third sealing ring, 42 nut, 43 oil-filling gastight inlet, 44 gastight screw, 45 gastight sealing ring, and 46 fixing flange.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other examples obtained by a person of ordinary skill in the art based on the examples of the present disclosure without creative efforts shall fall within the protection scope of the present disclosure.

An object of the present disclosure is to provide a high anti-vibration gas density monitor, to resolve the problems in the prior art.

To make the above-mentioned objectives, features, and advantages of the present disclosure clearer and more comprehensible, the present disclosure will be further described in detail below with reference to the accompanying drawings and the specific implementation.

Embodiment 1

As shown in FIGS. 1 to 5, a high anti-vibration gas density monitor in this embodiment includes a monitor enclosure 9, a signal control mechanism, and an indication value display mechanism. A sealed compartment 35 is provided in the monitor enclosure 9. The indication value display mechanism is provided in the sealed compartment 35. The sealed compartment 35 is filled with anti-vibration oil or hermetically filled with gas. The signal control mechanism is provided in the monitor enclosure 9 and outside the sealed compartment 35. The signal control mechanism and the indication value display mechanism are in gas communication with each other.

The signal control mechanism includes a corrugated pipe 17, a second sealed cavity 21, a first sealed cavity 22, a signal generator 19, and a signal regulation mechanism 20. The corrugated pipe 17 is provided in the second sealed cavity 21. One end of the corrugated pipe 17 is sealed, and the other end of the corrugated pipe 17 is in communication with an electrical device. Compensation gas is provided in the second sealed cavity 21. Alternatively, both ends of the corrugated pipe 17 are sealed to form the first sealed cavity 22. Compensation gas is provided in the first sealed cavity 22 of the corrugated pipe 17. The second sealed cavity 21 is in communication with the electrical device. The signal control mechanism monitors a gas density by the corrugated pipe 17 and the first sealed cavity and/or the second sealed cavity. When the gas density in the electrical device changes, the corrugated pipe 17 is compressed or expanded to cause an axial displacement, so as to drive the signal regulation mechanism 20 to trigger the signal generator 19 to generate a signal.

The indication value display mechanism includes a Bourdon tube 3, a base 5, an end holder 14, a temperature compensation element 4, a movement 6, a pointer 2, and a dial 1. One end of the Bourdon tube 3 is welded to the base 5, and both the other end of the Bourdon tube 3 and one end of the temperature compensation element 4 are fixed to the end holder 14. The other end of the temperature compensation element 4 is directly connected to the movement 6 or is connected to the movement 6 via a connection arm 13 and a connecting rod 7. The pointer 2 is mounted on the movement 6. The dial 1 is mounted in the sealed compartment 35.

Specifically, in this embodiment, the sealed compartment 35 includes an instrument glass 11, a display chassis 36, and a first sealing ring 37. The instrument glass 11 is of a cylindrical structure with an open end. The display chassis 36 is mounted at the open end of the instrument glass 11. The instrument glass 11 is fixed to the display chassis 36 via a fastener 25. A first sealing groove 38 is provided at a periphery of the display chassis 36. The first sealing ring 37 is provided in the first sealing groove 38 and is between the instrument glass 11 and the display chassis 36 for sealing. The display chassis 36 seals an inner cavity of the instrument glass 11 to form the sealed compartment 35 that accommodates the indication value display mechanism.

The display chassis 36 is further provided with a base mounting hole. A bottom end of the base 5 is mounted on the display chassis 36 through the base mounting hole. A second sealing ring 39 is provided between the base mounting hole and the base 5. One end of the base 5 extending out of the base mounting hole is fixed to the display chassis 36 via a fastener, for example a nut 42, and is in gas communication with the indication value display mechanism. A vent hole in communication with the Bourdon tube 3 is provided in the base 5. The display chassis 36 is further provided with an oil-filling and gastight inlet 43 in communication with the inner cavity of the sealed compartment 35. The oil-filling and gastight inlet 43 is provided with a gastight screw 44. A gastight sealing ring 45 is provided between the gastight screw 44 and the oil-filling and gastight inlet 43. The gastight screw 44 and the gastight sealing ring 45 are mainly configured to seal the oil-filling and gastight inlet 43 after the sealed compartment 35 is filled with anti-vibration oil, to prevent the anti-vibration oil from leaking during transmission. Alternatively, the gastight screw 44 and the gastight sealing ring 45 are mainly configured to seal an oil-filling inlet (or a gastight inlet) after the sealed compartment 35 is mounted, to form an absolute-pressure density monitor, to ensure that the indication value display mechanism of the density monitor is not affected by an altitude pressure.

In this embodiment, a head end of the monitor enclosure 9 is further provided with a transparent front-layer glass 26. Both the front-layer glass 26 and the instrument glass 11 are transparent glasses. An end surface of the instrument glass 11 is provided with a third sealing groove 40. The third sealing groove 40 is provided with a third sealing ring 41. The third sealing ring 41 is provided between the front-layer glass 26 and the instrument glass 11 for sealing. The front-layer glass 26 is fixed to the monitor enclosure 9 via an instrument panel 10. A fixing flange 46 is provided at a periphery of a front wall of the instrument glass 11 in this embodiment. The instrument panel 10 is connected to the instrument glass 11 by using the fixing flange 46. A sealing ring 12 is provided between a side wall of the instrument glass 11 and the instrument panel 10.

A supporting element 8 is provided between the display chassis 36 and a bottom of the monitor enclosure 9. One end of the supporting element 8 is fixed to the monitor enclosure, and the other end of the supporting element 8 contacts or is connected to the display chassis 36. The supporting element 8 can ensure a right position of the indication value display mechanism, to prevent the dial from being biased.

In this embodiment, a working principle of the indication value display mechanism is as follows. The Bourdon tube 3 of the indication value display mechanism is an elastic element that corrects a changing pressure and temperature by the temperature compensation element 4, to reflect a change of the gas density. That is, with the pressure of the tested gas, because of the temperature compensation element 4, an end of the Bourdon tube 3 is forced to elastically deform correspondingly and displaces. The displacement is transmitted to the movement 6 via the connecting rod 7, then to the pointer 2 via the movement 6, and a density value of the tested gas is gradually indicated on the dial 1. In this way, the density monitor can display the density value.

The signal control mechanism in this embodiment further includes a control casing 16, a first sealing element 15, a second sealing element 18, a third sealing element 32, and an outlet connection socket 24. One end of the corrugated pipe 17 is welded to the first sealing element 15, and the other end of the corrugated pipe 17 is welded to the second sealing element 18. A space inside the corrugated pipe 17 is the first sealed cavity 22. The first sealed cavity 22 is filled with compensation gas, to form a sealed compensation chamber. The outlet connection socket 24 is fixed to the third sealing element 32 or the control casing 16. Two end of the control casing 16 are sealedly connected to the first sealing element 15 and the third sealing element 32 respectively. A space inside the control casing 16 and outside the corrugated pipe 17 is a second sealed cavity 21. The second sealed cavity 21 is in communication with the electrical device and is in gas communication with the indication value display mechanism. The signal regulation mechanism 20 and the signal generator 19 are provided in the second sealed cavity 21.

Alternatively, the first sealed cavity 22 may further be in communication with the electrical device and is in gas communication with the indication value display mechanism. The second sealed cavity 21 is filled with compensation gas, to form a sealed compensation chamber.

Specifically, the signal regulation mechanism 20 is connected to the corrugated pipe 17 via a trigger lever. The trigger lever pulls or pushes the signal regulation mechanism 20 to trigger the signal generator 19 to generate a signal. The trigger lever is provided with a guiding element 33, to guide the trigger lever to move.

A working principle of the signal control mechanism is as follows. At a same temperature, in the first sealed cavity 22 and the second sealed cavity 21, densities are high while pressures are high, densities are identical while pressures are identical, and densities are low while pressures are low. At 20° C., if the first sealed cavity 22 is the cavity hermetically filled with a compensation gas, and a gas-filling pressure in the first sealed cavity 22 is the same as an alarm pressure, a differential pressure between the alarm pressure $P_{alarm}$ and the gas-filling pressure of the first sealed cavity 22 is $\Delta P=0$ MPa. When $\Delta P=0$ MPa, an alarm contact operates. No matter a temperature increases or decreases, if gas leakage occurs in the electrical device, when a pressure $P_{device}$ of the electrical device equals to the $P_{alarm}$, that is, $\Delta P=0$ MPa, the density monitor triggers the corresponding signal generator 19 by using the signal regulation mechanism 20, and a contact of the signal generator 19 is on and sends a corresponding signal (an alarm or a lockout), to monitor and control a gas density in a device such as a high-pressure switch, so that the electrical device works safely.

In this embodiment, the signal control mechanism is fixed to the bottom of the monitor enclosure via a fixing element 23.

In this embodiment, the signal control mechanism further includes a limit mechanism 29. The limit mechanism 29 is provided on the control casing 16 and is opposite to the signal regulation mechanism 20, to limit the signal regulation mechanism 20.

In this embodiment, the signal control mechanism further includes an air inlet 28 in communication with the electrical device. The air inlet 28 and the outlet connection socket 24 are provided at two ends of the control casing 16 respectively control casing.

To make the first sealed cavity 22 or the second sealed cavity 21 in gas communication with the indication value display mechanism, this embodiment further includes a connector 27, a first connection tube 30, and a second connection tube 31. The connector 27 is connected to the electrical device and is fixed to the monitor enclosure 9. One end of the first connection tube 30 is connected to the electrical device via the connector 27, and the other end of the first connection tube 30 is connected to the base 5 and is in communication with the venting hole in the base 5 so as to be in communication with the Bourdon tube 3. One end of the second connection tube 31 is connected to the base 5 and is in communication with the venting hole in the base, and the other end of the second connection tube 31 is in communication with the signal control mechanism through the air inlet 28.

Alternatively, the one end of the first connection tube 30 and the one end of the second connection tube 31 are connected to the electrical device via the connector 27, the other end of the first connection tube 30 is connected to the base 5 and is in communication with the venting hole in the base 5, and the other end of the second connection tube 31 is in communication with the signal control mechanism through the air inlet 28.

Alternatively, the one end of the first connection tube 30 is connected to the electrical device via the connector 27, and the other end of the first connection tube 30 is in communication with the signal control mechanism through the air inlet 28. The one end of the second connection tube 31 is in communication with the signal control mechanism through the air inlet 28, and the other end of the second connection tube 31 is connected to the base 5 and is in communication with the venting hole in the base 5.

In this embodiment, an outer bottom of the monitor enclosure 9 is further provided with a base plate (not shown in the figure). The connector 27 is fixed to the base plate. The base plate is connected to the monitor enclosure 9 through multiple shock absorbers or shock pads.

In this embodiment, an insulation layer wraps around the signal control mechanism or the monitor enclosure 9. The movement 6 is provided with a damping mechanism used for damping. The damping mechanism includes but is not limited to one or multiple of an inertia wheel, a combination of an inertia wheel and a damping grease, or a combination of a damper and a damping grease.

In this embodiment, the gas density monitor further includes an electrical signal remote transmission unit. The electrical signal remote transmission unit includes a pressure sensor, a temperature sensor, a microprocessor, and a communication module. The microprocessor is connected to the pressure sensor, the temperature sensor, and the communication module. The pressure signals and temperature signals are collected by the microprocessor with the pressure sensor and the temperature sensor, and corresponding density values are obtained by the microprocessor according to a gas pressure-temperature property. The data obtained by the microprocessor is remotely transmitted by the communication module, so that the gas density of the electrical device is monitored online.

The gas density monitor further includes an online testing unit. The online testing unit includes a gas density detection sensor, a pressure regulation mechanism, a valve, an online testing contact signal sampling unit, and an intelligent control unit. The pressure regulation mechanism is in gas communication with the signal control mechanism. The pressure regulation mechanism is configured to regulate a pressure of the signal control mechanism, so that the signal control mechanism generates a contact signal operation. The gas density detection sensor is in gas communication with the signal control mechanism. The online testing contact signal sampling unit is connected to the signal control mechanism and is configured to sample the contact signal of the signal control mechanism. One end of the valve is provided with an interface in communication with the electrical device, and the other end of the valve is in communication with the signal control mechanism. Alternatively, the other end of the valve is in gas communication with the pressure regulation mechanism, so that the valve is in communication with the signal control mechanism. The intelligent control unit is connected to the gas density detection sensor, the pressure regulation mechanism, the valve, and the online testing contact signal sampling unit, and is configured to control the valve to close or open, to achieve control of the pressure regulation mechanism, pressure collection and temperature collection, and/or gas density collection, and detect a contact signal operation value and/or a contact signal return value of the signal control mechanism. Alternatively, the online testing unit includes a gas density detection sensor, a temperature regulation mechanism, an online testing contact signal sampling unit, and an intelligent control unit. The temperature regulation mechanism is a mechanism that can regulate a temperature and is configured to regulate a temperature of a sealed compensation chamber of the signal control mechanism, so that the signal control mechanism performs a contact signal operation. The gas density detection sensor is in gas communication with the signal control mechanism. The online testing contact signal sampling unit is directly or indirectly connected to the signal control mechanism, and is configured to sample a contact signal generated when the contact of the signal control mechanism performs an operation. The intelligent control unit is connected to the gas density detection sensor, the temperature regulation mechanism, and the online testing contact signal sampling unit, and is configured to achieve control of the temperature regulation mechanism, pressure collection and temperature collection, and/or gas density collection, and detect a contact signal operation value and/or a contact signal return value of the gas density monitor.

The temperature compensation element 4 is a bimetallic strip, or a Bourdon tube 3 hermetically filled with compensation gas, or a micro corrugated pipe 17 hermetically filled with compensation gas. That is, the temperature compensation element 4 includes but is not limited to one of a bimetallic strip, a Bourdon tube hermetically filled with compensation gas, and a micro corrugated pipe hermetically filled with compensation gas.

The high anti-vibration gas density monitor in this embodiment further includes a micro moisture sensor connected to the signal control mechanism or the display mechanism, and/or a decomposition sensor connected to the signal control mechanism or the display mechanism, and/or a gas purity sensor connected to the signal control mechanism or the display mechanism.

The gas density monitor further includes a heating apparatus. The heating apparatus includes but is not limited to one of a silicon rubber heater, a resistance wire, a ribbon heater, an electrical bar, an air heater, an infrared heater, and a semiconductor. The heating apparatus can, together with the pressure sensor, the temperature sensor, and the intelligent control unit, test the gas density monitor. Alternatively, the heating apparatus can make the contact of the gas density monitor perform an operation, and can, together with the display mechanism or the pressure sensor, the temperature sensor, and the intelligent control unit, test the gas density monitor.

Embodiment 2

Figure 6:
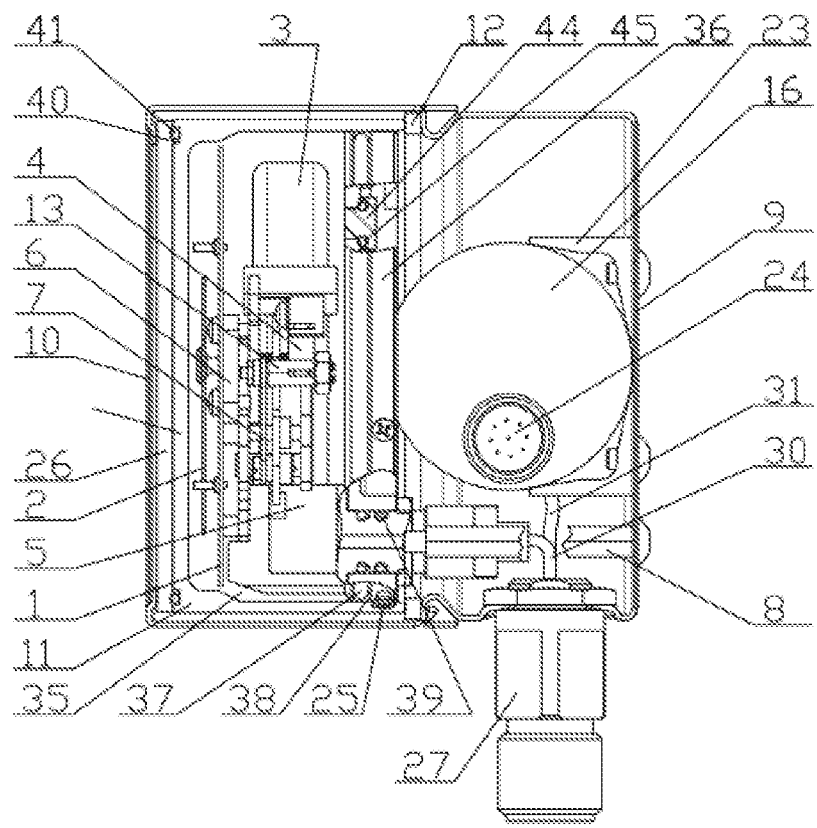
FIG. 6 is a schematic side structural diagram of a high anti-vibration gas density monitor in Embodiment 2 of the present disclosure.
Figure 7:
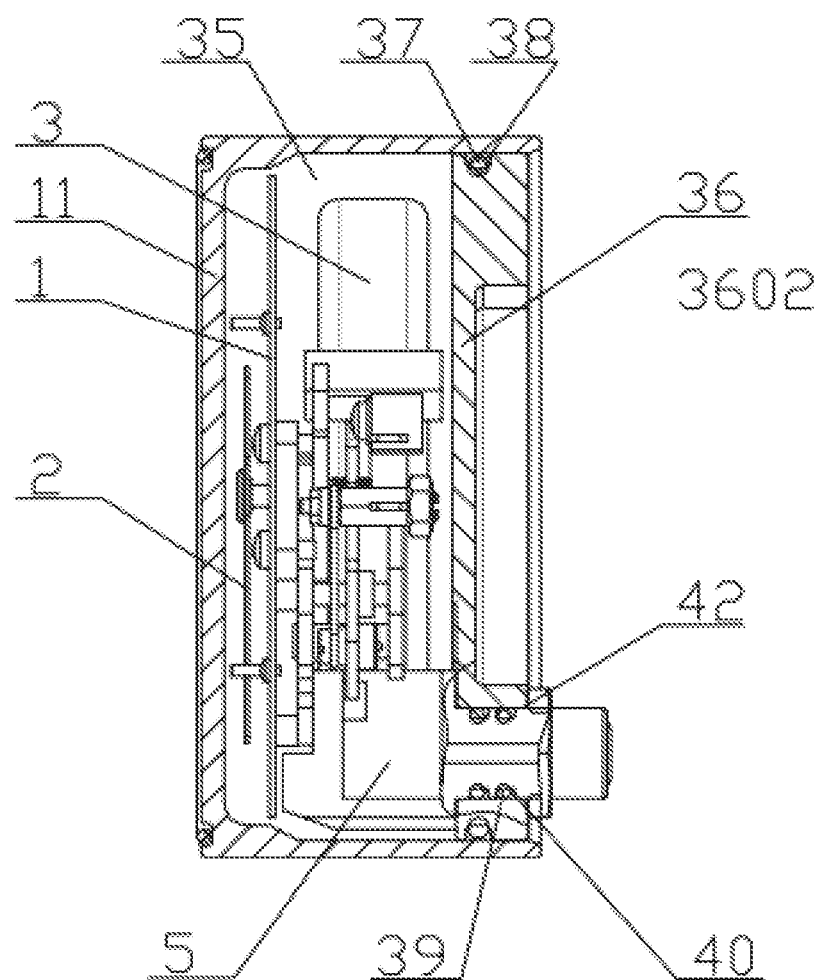
FIG. 7 is a schematic side structural diagram of a display mechanism of the high anti-vibration gas density monitor in Embodiment 2 of the present disclosure.

This embodiment is different from Embodiment 1 in the following aspects. As shown in FIGS. 6 and 7, an instrument panel 10 is a high instrument panel 10. That is, the instrument panel 10 in this embodiment is much higher than the instrument panel 10 in Embodiment 1, by at least 20 mm. The instrument panel 10 sleeves on a front-layer glass 26 and an instrument glass 11. A side wall of the instrument panel 10 is higher than a side wall of the instrument glass 11. A sealing gasket is provided between a top open end of a monitor enclosure 9 and a display chassis 36. In this embodiment, a fixing element 23 is an angle steel. A control casing 16 of a signal control mechanism is welded to the fixing element 23. The fixing element 23 is fixed to a bottom of an enclosure via multiple screws.

Embodiment 3

Figure 8:
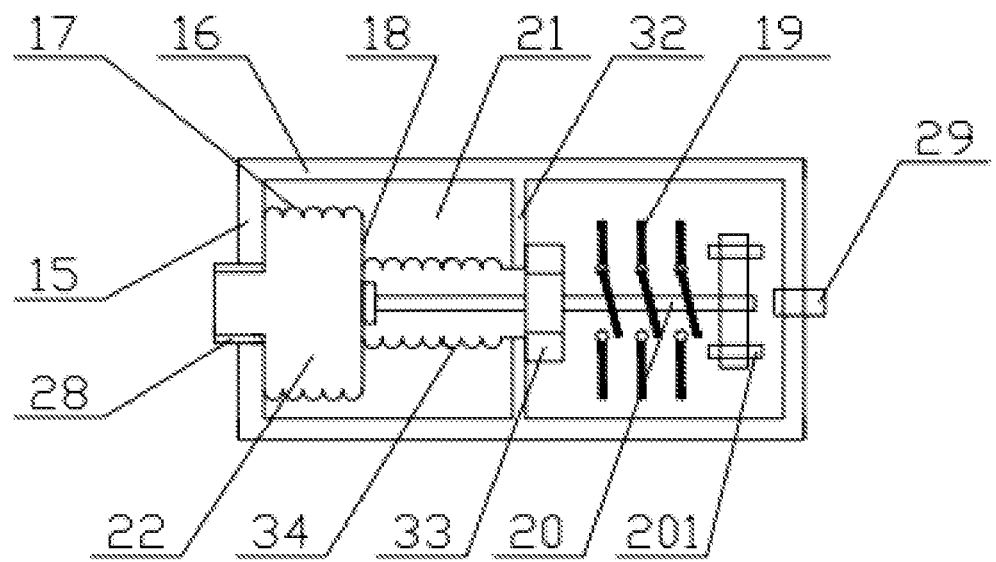
FIG. 8 is a schematic structural diagram of a signal control mechanism of the high anti-vibration gas density monitor in Embodiment 2 of the present disclosure.

This embodiment is different from Embodiment 1 in the following aspects. As shown in FIG. 8, the signal control mechanism further includes a control casing 16, a first sealing element 15, a second sealing element 18, a third sealing element 32, a sealing corrugated pipe 34, and an outlet connection socket 24. The outlet connection socket 24 (not shown in the figure) is hermetically fixed to the control casing 16. The third sealing element 32 is provided in the control casing 16. The third sealing element 32 divides an inner cavity of the control casing 16 into a second sealed cavity 21 and a signal regulation cavity. A corrugated pipe 17 is provided in the second sealed cavity 21. One end of the corrugated pipe 17 is welded to the first sealing element 15, and the other end of the corrugated pipe 17 is welded to the second sealing element 18. A space inside the corrugated pipe 17 is a first sealed cavity 22, which is filled with compensation gas, to form a sealed compensation chamber. One end of the sealing corrugated pipe 34 is welded to the second sealing element 18, and the other end of the sealing corrugated pipe 34 is welded to the third sealing element 32. The control casing 16 is hermetically connected to the first sealing element 15 and the third sealing element 32. The second sealed cavity 21 is in communication with an electrical device and is in gas communication with the indication value display mechanism. A signal regulation mechanism 20 and a signal generator 19 are provided in the signal regulation cavity. Alternatively, the first sealed cavity 22 is in communication with an electrical device and is in gas communication with the indication value display mechanism. The second sealed cavity 21 is filled with compensation gas, to form a sealed compensation chamber. In this embodiment, the signal regulation mechanism 20 is provided with a signal regulation element, to regulate an alarm or a lockout signal contact operation value. Specifically, the signal regulation element may be a regulation bolt, and the alarm or lockout signal contact operation value is regulated according to a distance between the regulation bolt and the signal generator 19. The signal control mechanism in this embodiment works in the same way as the signal control mechanism in Embodiment 1, and details are not provided herein again.

As shown in FIG. 8, the signal generator 19 may be provided on the left of the signal regulation element 201. Alternatively, the signal generator 19 may be provided on the right of the signal regulation element 201.

Compared with an oil-filling density monitor with an electrical contact widely used at the present, the high anti-vibration gas density monitor of the present embodiment includes a signal control mechanism and an indication value display mechanism that are independent from each other. The signal control mechanism mainly includes at least one corrugated pipe 17, a sealed compensation chamber, and at least one micro switch. The corrugated pipe 17 is perpendicular to a side wall of the control casing. The indication value display mechanism mainly includes a Bourdon tube 3, a base 5, an end holder, a movement 6, a pointer 2, and a dial 1. The high anti-vibration gas density monitor of the present embodiment does not need to be oil-filled, and has good anti-vibration and electrical performance, high accuracy, a thin profile, and a long service life. The performance of the high anti-vibration gas density monitor is greatly improved through such creative design and processing. Specifically, after a comparison test, it can be seen from Table 1 that the density monitor of the present disclosure, compared with the density monitor in the prior art, is better in electrical performance and higher in accuracy, and is thinner in profile and longer in service life, so that performance of the density monitor can be greatly improved, to ensure power grid to operate safely and reliably.

TABLE 1

Contrast report of performance between the density monitor of the present disclosure and the density monitor in the prior art

| Sequence number | Tested project | Density monitor of the present disclosure | Density monitor in the prior art |
|---|---|---|---|
| 1 | Sealing performance of sealed compartment | $10^{-8}$ mbar · 1/s | $10^{-5}$ mbar · 1/s |
| 2 | Leakage, service life | Low temperature of −40° C., not leak oil for a long time | Low temperature of −40° C., very likely to leak |
| 3 | Thickness of profile | 85 mm | 97 mm |
| 4 | Temperature compensation accuracy (−30° C. to 60° C.) | Maximum error 0.01 MPa | Maximum error 0.025 MPa |
| 5 | Anti-vibration performance | 60 g, 11 ms | 50 g, 7 ms |
| 6 | Power frequency withstand voltage | 3 kV | 2 kV |
| 7 | Contact resistance | 1 Ω | 5 Ω |
| 8 | Contact life (in an electrical circuit with an on-off current of 0.2 A and L/R <40 ms) | 30000 times | 3000 times |
| 9 | Level of protection | IP 68 | IP 54 |

According to the density monitor of the present disclosure, an open end of the instrument glass is flange-shaped.

At least one first groove is provided between the flange-shaped open end of the instrument glass and the display chassis. At least one first sealing ring is provided in the first groove. The first groove is provided at the flange-shaped open end of the instrument glass or on the display chassis. The base is hermetically fixed to the display chassis.

According to the density monitor of the present disclosure, the density monitor further includes a front-layer glass and an instrument panel. A front wall of the instrument glass is transparent and is provided with a third groove. A third sealing ring is provided in the third groove. The front-layer glass and the front wall of the instrument glass contact the third sealing ring. The front-layer glass is fixed to the enclosure via the instrument panel and the instrument glass. Alternatively, the sealed compartment includes an instrument glass, an intermediate element, a display chassis, and sealing rings. The intermediate element is a cylinder. At least one first groove is provided between the intermediate element and the display chassis. At least one first sealing ring is provided in the first groove. At least one fourth groove is provided between the intermediate element and the instrument glass. At least one fourth sealing ring is provided in the fourth groove. The base is hermetically fixed to the display chassis.

According to the density monitor of the present disclosure, the corrugated pipe is perpendicular to the side wall of the control casing. Alternatively, the corrugated pipe is approximately perpendicular to the side wall of the control casing, and an included angle therebetween is not greater than 45 degrees. The signal control mechanism further includes a control casing, a first sealing element, a second sealing element, a third sealing element, and an outlet connection socket. One end of the corrugated pipe is welded to the first sealing element, and the other end of the corrugated pipe is welded to the second sealing element. An inner wall of the corrugated pipe, the first sealing element, and the second sealing element jointly form a first sealed cavity. The first sealed cavity is filled with compensation gas, to form a sealed compensation chamber. The outlet connection socket is fixed to the third sealing element or the control casing. The control casing is hermetically connected to the first sealing element and the third sealing element. An outer wall of the corrugated pipe, the first sealing element, the second sealing element, the third sealing element, the outlet connection socket, and the control casing jointly form a second sealed cavity. The second sealed cavity is in gas communication with the indication value display mechanism. The signal regulation mechanism and the signal generator are provided in the second sealed cavity. Alternatively, the first sealed cavity is in gas communication with the indication value display mechanism, and the second sealed cavity is filled with compensation gas, to form a sealed compensation chamber. In addition, the signal control mechanism may further include a control casing, a first sealing element, a second sealing element, and a third sealing element. The corrugated pipe includes a first corrugated pipe and a second corrugated pipe. One end of the first corrugated pipe is welded to the first sealing element, and the other end is welded to the second sealing element. An inner wall of the first corrugated pipe, the first sealing element, and the second sealing element jointly form a first sealed cavity. The first sealed cavity is filled with compensation gas, to form a sealed compensation chamber. One end of the second corrugated pipe is welded to the second sealing element, and the other end is welded to the third sealing element. The control casing is hermetically connected to the first sealing element and the third sealing element. The first sealing element, an outer wall of the first corrugated pipe, the second sealing element, an outer wall of the second corrugated pipe, the third sealing element, and an inner wall of the control casing jointly form a second sealed cavity. The second sealed cavity is in gas communication with the indication value display mechanism. The signal regulation mechanism is connected to the second sealing element, the signal generator is provided at a position corresponding to the signal regulation mechanism. Alternatively, the first sealed cavity is in gas communication with the indication value display mechanism, and the second sealed cavity is filled with compensation gas, to form a sealed compensation chamber. Alternatively, the signal control mechanism of the high anti-vibration gas density monitor further includes a limit mechanism. The limit mechanism is provided at a position opposite to the signal regulation mechanism. The limit mechanism can prevent the signal regulation mechanism from repeated vibration, thereby improving anti-vibration performance of the density monitor.

Specific examples are used herein for illustration of the principles and implementations of the disclosure. The above description of the examples is only intended to help understand the method of the disclosure and its core ideas. Moreover, those of ordinary skill in the art can make various modifications to specific implementations and scope of application in accordance with the concepts of the disclosure. In conclusion, the contents of this specification shall not be construed as limitations to the disclosure.

What is claimed is:

1. A high anti-vibration gas density monitor, comprising:
    a monitor enclosure in which a sealed compartment filled with anti-vibration oil or hermetically filled with gas is provided;
    an indication value display mechanism in the sealed compartment, the indication value display mechanism comprising a Bourdon tube, a base, an end holder, a temperature compensation element, a movement, a pointer, and a dial;
    a signal control mechanism in the monitor enclosure and outside the sealed compartment, the signal control mechanism comprising a second sealed cavity, a corrugated pipe in the second sealed cavity, a signal generator, and a signal regulation mechanism;
    wherein the signal control mechanism and the indication value display mechanism are in gas communication with each other, one end of the corrugated pipe is sealed, an other end of the corrugated pipe is in communication with an electrical device, and compensation gas is provided in the second sealed cavity;
    wherein the signal control mechanism is configured to monitor a gas density by using the corrugated pipe and the second sealed cavity, and when the gas density in the electrical device changes, the corrugated pipe is compressed or expanded to produce an axial displacement so as to drive the signal regulation mechanism to trigger the signal generator to generate a signal;
    wherein one end of the Bourdon tube is fixed to the base, both an other end of the Bourdon tube and one end of the temperature compensation element are fixed to the end holder, an other end of the temperature compensation element is directly connected to the movement or connected to the movement via a connection arm and a connecting rod, the pointer is mounted on the movement, and the dial is mounted in the sealed compartment; and
    wherein the Bourdon tube is an elastic element that corrects a changing pressure and temperature by the temperature compensation element to reflect a change of the gas density, an end of the Bourdon tube is forced to elastically deform, displacement of the end of the Bourdon tube is transmitted to the movement, then to the pointer via the movement, and a density value is indicated on the dial.

2. The high anti-vibration gas density monitor of claim 1, wherein:
the sealed compartment comprises an instrument glass, a display chassis, and a first sealing ring;
the instrument glass is of a cylindrical structure with an open end;
the display chassis is mounted at the open end of the instrument glass;
the first sealing ring is provided between the instrument glass and the display chassis for sealing; and
an inner cavity of the instrument glass is sealed by the display chassis to form the sealed compartment for accommodating the indication value display mechanism.

3. The high anti-vibration gas density monitor of claim 2, wherein the instrument glass is fixed to the display chassis via a fastener.

4. The high anti-vibration gas density monitor of claim 2, wherein:
the display chassis is further provided with a base mounting hole;
a bottom end of the base is mounted on the display chassis through the base mounting hole;
a second sealing ring is provided between the base mounting hole and the base;
an end of the base extending out of the base mounting hole is firmly fixed to the display chassis via a nut and is in gas communication with the indication value display mechanism; and
a venting hole in communication with the Bourdon tube is provided in the base.

5. The high anti-vibration gas density monitor of claim 2, wherein:
the display chassis is further provided with an oil-filling and gastight inlet in communication with an inner cavity of the sealed compartment;
a gastight screw is provided on the oil-filling and gastight inlet; and
a gastight sealing ring is provided between the gastight screw and the oil-filling and gastight inlet.

6. The high anti-vibration gas density monitor of claim 2, wherein:
a head end of the monitor enclosure is further provided with a front-layer glass that is transparent;
a third sealing ring is provided between the front-layer glass and a front wall of the instrument glass; and
the front-layer glass is fixed to the monitor enclosure via an instrument panel.

7. The high anti-vibration gas density monitor of claim 6, wherein:
a fixing flange is provided around the front wall of the instrument glass;
the instrument panel is connected to the instrument glass via the fixing flange; and
a fourth sealing ring is provided between a side wall of the instrument glass and the instrument panel.

8. The high anti-vibration gas density monitor of claim 6, wherein:
instrument panel sleeves are on the front-layer glass and the instrument glass;
a side wall of the instrument panel has a height higher than that of a side wall of the instrument glass; and
a sealing gasket is provided between a top open end of the monitor enclosure and the display chassis.

9. The high anti-vibration gas density monitor of claim 2, wherein a supporting element is provided between the display chassis and a bottom of the monitor enclosure.

10. The high anti-vibration gas density monitor of claim 1, wherein:
the signal control mechanism further comprises a control casing, a first sealing element, a second sealing element, a third sealing element, and an outlet connection socket;
the one end of the corrugated pipe is welded to the first sealing element, and the other end of the corrugated pipe is welded to the second sealing element;
a space inside the corrugated pipe is a first sealed cavity and the first sealed cavity is filled with the compensation gas to form a sealed compensation chamber;
the outlet connection socket is fixed to the third sealing element or the control casing, and the control casing is hermetically connected to the first sealing element and the third sealing element;
a space inside the control casing and outside the corrugated pipe is the second sealed cavity, and:
the second sealed cavity is in communication with the electrical device and in gas communication with the indication value display mechanism, the signal regulation mechanism and the signal generator being provided in the second sealed cavity; or
the first sealed cavity is in communication with the electrical device and in gas communication with the indication value display mechanism, the second sealed cavity being filled with the compensation gas, to form a sealed compensation chamber.

11. The high anti-vibration gas density monitor of claim 10, wherein the signal regulation mechanism is connected to the corrugated pipe via a trigger lever, and the trigger lever pulls or pushes the signal regulation mechanism to trigger the signal generator to generate a signal.

12. The high anti-vibration gas density monitor of claim 11, wherein the trigger lever is provided with a guiding element.

13. The high anti-vibration gas density monitor of claim 10, wherein the signal control mechanism further comprises an air inlet in communication with the electrical device.

14. The high anti-vibration gas density monitor of claim 13, further comprising a connector, a first connection tube, and a second connection tube, wherein the connector is connected to the electrical device and is fixed to the monitor enclosure and:
one end of the first connection tube is connected to the electrical device via the connector, an other end of the first connection tube is in communication with the base and is connected to a venting hole in the base, one end of the second connection tube is in communication with the base and is connected to the venting hole in the base, and an other end of the second connection tube is in communication with the signal control mechanism through the air inlet; or
the one end of the first connection tube and the one end of the second connection tube each are connected to the electrical device via the connector, the other end of the first connection tube is connected to the base and is in communication with the venting hole in the base, and the other end of the second connection tube is in communication with the signal control mechanism through the air inlet; or the one end of the first connection tube is connected to the electrical device via the connector, the other end of the first connection tube is in communication with the signal control mechanism through the air inlet, the one end of the second connection tube is in communication with the signal control mechanism through the air inlet, and the other end of the second connection tube is in communication with the base and is connected to the venting hole in the base.

15. The high anti-vibration gas density monitor according to claim 14, wherein a base plate is further provided at an outer bottom of the monitor enclosure, the connector is fixed to the base plate, and the base plate is connected to the monitor enclosure through multiple shock absorbers or shock pads.

16. The high anti-vibration gas density monitor of claim 10, wherein the signal control mechanism is fixed to a bottom of the monitor enclosure via a fixing element.

17. The high anti-vibration gas density monitor of claim 10, wherein the signal control mechanism further comprises a limit mechanism, and the limit mechanism is provided on the control casing and is opposite to the signal regulation mechanism, to limit the signal regulation mechanism.

18. The high anti-vibration gas density monitor of claim 1, wherein:
the signal control mechanism further comprises a control casing, a first sealing element, a second sealing element, a third sealing element, a sealing corrugated pipe, and an outlet connection socket;
the outlet connection socket is fixed to the control casing;
the third sealing element is provided in the control casing and divides an inner cavity of the control casing into the second sealed cavity and a signal regulation cavity;
the corrugated pipe is provided in the second sealed cavity, the one end of the corrugated pipe being welded to the first sealing element and the other end of the corrugated pipe being welded to the second sealing element;
a space inside the corrugated pipe is a first sealed cavity and the first sealed cavity is filled with the compensation gas to form a sealed compensation chamber;
one end of the sealing corrugated pipe is welded to the second sealing element and an other end of the sealing corrugated pipe is welded to the third sealing element;
the control casing is hermetically connected to the first sealing element and the third sealing element; and
either:
the second sealed cavity is in communication with the electrical device and in gas communication with the indication value display mechanism, the signal regulation mechanism and the signal generator being provided in the signal regulation cavity; or
the first sealed cavity is in communication with the electrical device and in gas communication with the indication value display mechanism, the second sealed cavity being filled with the compensation gas to form a sealed compensation chamber.

19. The high anti-vibration gas density monitor of claim 18, wherein the signal regulation mechanism is connected to the corrugated pipe via a trigger lever, and the trigger lever pulls or pushes the signal regulation mechanism to trigger the signal generator to generate a signal.

20. The high anti-vibration gas density monitor of claim 18, wherein the signal control mechanism further comprises an air inlet in communication with the electrical device.

21. The high anti-vibration gas density monitor of claim 18, wherein the signal control mechanism is fixed to a bottom of the monitor enclosure via a fixing element.

22. The high anti-vibration gas density monitor of claim 18, wherein the signal control mechanism further comprises a limit mechanism, and the limit mechanism is provided on the control casing and is opposite to the signal regulation mechanism, to limit the signal regulation mechanism.

23. The high anti-vibration gas density monitor of claim 1, wherein an insulation layer wraps around the signal control mechanism or the monitor enclosure.

24. The high anti-vibration gas density monitor of claim 1, further comprising an electrical signal remote transmission unit that comprises a pressure sensor, a temperature sensor, a microprocessor, and a communication module, wherein the microprocessor is connected to the pressure sensor, the temperature sensor, and the communication module, the microprocessor being configured to:
collect pressure and temperature signals with the pressure sensor and the temperature sensor;
obtain corresponding density values according to a gas pressure-temperature property; and
remotely transmit the obtained density values using the communication module so that the gas density of the electrical device is monitorable online.

25. The high anti-vibration gas density monitor of claim 1, wherein the temperature compensation element is a bimetallic strip or a Bourdon tube hermetically filled with compensation gas or a micro corrugated pipe hermetically filled with compensation gas.

26. A high anti-vibration gas density monitor, comprising:
a monitor enclosure in which a sealed compartment filled with anti-vibration oil or hermetically filled with gas is provided;
an indication value display mechanism in the sealed compartment, the indication value display mechanism comprising a Bourdon tube, a base, an end holder, a temperature compensation element, a movement, a pointer, and a dial;
a signal control mechanism in the monitor enclosure and outside the sealed compartment, the signal control mechanism comprising a corrugated pipe, a first sealed cavity and a second sealed cavity, a signal generator, and a signal regulation mechanism, wherein the signal control mechanism and the indication value display mechanism are in gas communication with each other, and the corrugated pipe is provided in the second sealed cavity; one end and an other end of the corrugated pipe are sealed to form the first sealed cavity, compensation gas is provided in the first sealed cavity of the corrugated pipe, and the second sealed cavity is in communication with an electrical device; the signal control mechanism monitors a gas density by using the corrugated pipe, the first sealed cavity and second sealed cavity; and when the gas density in the electrical device changes, the corrugated pipe is compressed or expanded to produce an axial displacement so as to drive the signal regulation mechanism to trigger the signal generator to generate a signal;
wherein one end of the Bourdon tube is fixed to the base, both an other end of the Bourdon tube and one end of the temperature compensation element are fixed to the end holder, an other end of the temperature compensation element is directly connected to the movement or connected to the movement via a connection arm and a connecting rod, the pointer is mounted on the movement, and the dial is mounted in the sealed compartment; and wherein the Bourdon tube is an elastic element that corrects a changing pressure and temperature by the temperature compensation element to reflect a change of the gas density, an end of the Bourdon tube is forced to elastically deform, displacement of the end of the Bourdon tube is transmitted to the movement, then to the pointer via the movement, and a density value is indicated on the dial.

\* \* \* \* \*